United States Patent [19]

Kassai

[11] 4,362,315
[45] Dec. 7, 1982

[54] BABY CARRIAGE

[75] Inventor: Kenzou Kassai, Osaka, Japan

[73] Assignee: Kassai Kabushikikaisha, Osaka, Japan

[21] Appl. No.: 229,020

[22] Filed: Jan. 27, 1981

[30] Foreign Application Priority Data

Jan. 30, 1980 [JP] Japan .................................. 55-10424

[51] Int. Cl.³ .............................................. B62B 7/06
[52] U.S. Cl. .................................... 280/650; 280/644; 280/42; 297/45; 297/DIG. 4
[58] Field of Search .................. 280/648–650, 280/47.4, 47.41, 644, 642–644, 42, 647; 297/45, 284, 61, 408, 396, 39, DIG. 4, 40–42

[56] References Cited

U.S. PATENT DOCUMENTS

| 2,737,232 | 3/1956 | Gruber | 297/39 |
| 3,142,351 | 7/1964 | Green | 297/DIG. 4 |
| 3,989,295 | 11/1976 | Sparkes | 297/45 |

*Primary Examiner*—Joseph F. Peters, Jr.
*Assistant Examiner*—T. P. Roesch
*Attorney, Agent, or Firm*—W. G. Fasse; D. H. Kane, Jr.; D. F. Gould

[57] ABSTRACT

A foldable baby carriage has a pair of front legs and a pair of rear legs, with each rear leg being pivotally connected to the intermediate portion of the associated front leg and rearwardly downwardly extending therefrom. An angle bar is pivotally supported above the upper surface of each rear leg intermediate between the ends of the latter and has a pusher rod pivotally connected thereto. With the baby carriage in the opened state, the angle bar is substantially in line with the associated pusher rod portion. With the baby carriage in the closed state, the angle bar and the associated pusher rod portion are in bent relation to each other, thus reducing the vertical dimension of the baby carriage and at the same time reducing the distance between the front legs and between the rear legs and the distance between the front and rear legs, thereby establishing the folded state of the baby carriage.

9 Claims, 17 Drawing Figures

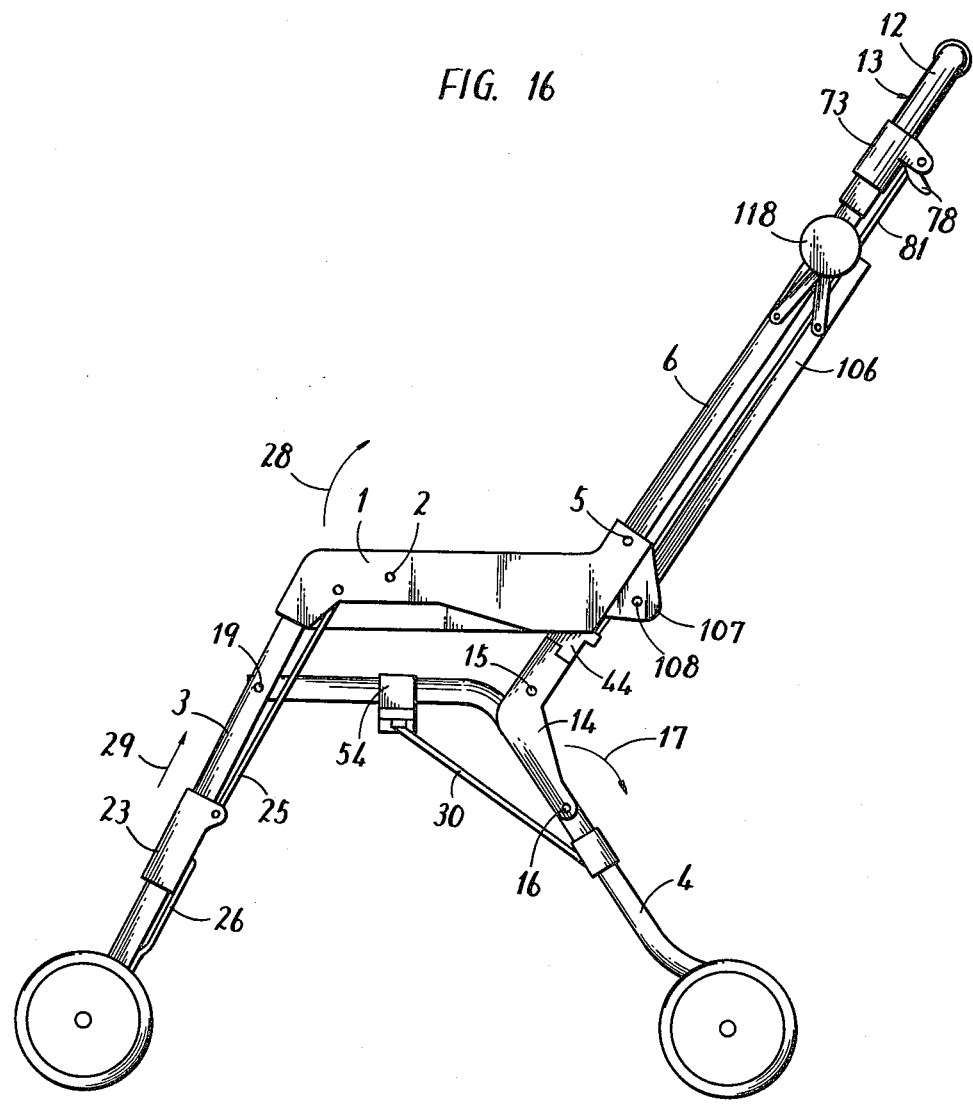

BABY CARRIAGE

BACKGROUND OF THE INVENTION

1. Field of the Invention

The present invention relates to improvements in a baby carriage, and more particularly it relates to improvements in the folding mechanism used in baby carriages of chair type construction.

2. Description of the Prior Art

Heretofore, a variety of basic baby carriage constructions have been proposed and put into practical use. Baby carriages of such proposed basic constructions include one having a chair type basic construction. Further, a foldable version of such baby carriage of chair type basic construction has also been proposed.

However, such foldable baby carriages of chair type basic construction still have some points which remain to be improved. More particularly, such conventional type, when folded, is still bulky. Accordingly, it is desired that in the folded state, it has a much smaller size, in terms of height, width and length. Further, such conventional type of baby carriage is not necessarily simple in folding operation. Accordingly, there is a desire for a baby carriage which is simple in folding operation, for example, to the extent that it can be folded by one hand.

Further referring to the configuration of the baby carriage in the folded state described above, where it is designed to be carried on the user's arm as a carrying means when it is in the folded state, it is desired that it can be fully decreased in height to assume a short bar form. It is also convenient then that the user is allowed to walk while pulling the baby carriage in the folded state by making use of the rolling of the wheels. Further, such manner of conveyance requires that the baby carriage be sufficiently lightweight not to become a burden.

SUMMARY OF THE INVENTION

Accordingly, a principal object of the present invention is to provide a folding mechanism for baby carriages of chair type basic construction, which mechanisms greatly reduces the bulk of the baby carriage in the folded state and simplifies the folding operation.

In brief, the present invention provides a baby carriage which comprises a pair of support leg pusher rod connecting rods disposed to extend longitudinally, a pair of front legs each pivotally connected to the relatively forward portion of the associated support leg pusher rod connecting rod, a pair of rear legs each pivotally connected to the intermediate portion of the associated front leg and rearwardly downwardly extending therefrom, a pair of pusher rod support angle bars each pivotally connected at one end thereof to the intermediate portion of the associated rear leg and adapted to be vertically turnable, a pair of pusher rod bodies each pivotally connected at the lower end thereof to the other end of the associated pusher rod support angle bar and pivotally connected to the rear end of the associated support leg pusher rod connecting rod at a pivot point spaced a predetermined distance from the lower end of said pusher rod body, a pair of connecting rod turning members each axially slidably fitted on the middle portion of the associated front leg, a front leg connecting rod downwardly foldable at the middle thereof, pivotally connected at the opposite ends thereof to said connecting rod turning members and pivotally connected at positions spaced a predetermined distance from each end thereof to arms extending from said front legs, bar links connected between said connecting rod turning members and the front ends of said support leg pusher rod connecting rods, and a pusher rod connecting member foldable at the middle thereof and pivotally supported at the opposite ends thereof by said pusher rod bodies, the arrangement being such that when said pusher rod support angle bars are upwardly turned each around a pivot point on one end thereof, the opened state of the baby carriage is established and that when said pusher rod connecting member is folded and said pusher rod support angle bars are turned in the opposite direction around said pivot points, said front legs, rear legs, support leg pusher rod connecting rods and pusher rod bodies are respectively turned toward each other while in response to the turning of said support leg connecting rods, said bar links cause said connecting rod turning members to slide upward while folding said front leg connecting rod, thereby establishing the folded state of the baby carriage in which the longitudinal, transverse and vertical dimensions thereof have been reduced.

According to the present invention, in the opened state of the baby carriage, the pusher rod is lifted to a sufficiently high level because of the pusher rod support angle bars being brought to an upwardly directed position, while in the folded state, the pusher rod is brought to a low level because of the pusher rod support angle bars being brought to a downwardly directed position. As a result, in the opened position, the pusher rod secures the necessary level and in the folded state, the bulkiness in the vertical direction is reduced. Further, the pusher rod, support leg pusher rod connecting rods, front legs and rear legs are brought together in substantially parallel relation, with the result that the bulkiness in the transverse and longitudinal directions are also fully reduced. Therefore, when it is desired to carry the baby carriage on the user's arm as one carrying means, this can be done so with ease. Further, since the front and rear wheels are directed in the same direction when the baby carriage is folded, it is possible to carry the baby carriage by pulling it, by making use of the rolling of the wheels. Further, the folding can be effected in one operation by one hand. The opened state of the baby carriage is firm since the load on the hammock acts to cause the connecting rod turning members and bar links to straighten the front leg connecting rod.

This and other objects and features of the invention will become more apparent from the following description when taken in conjunction with the accompanying drawings.

BRIEF DESCRIPTION OF THE DRAWINGS

FIG. 4 is an enlarged side view showing a state corresponding to that of FIG. 2, illustrating the movement of a pusher rod support angle bar 14;

FIG. 16 is a right-hand side view of another embodiment of the invention, illustrating the opened state of the baby carriage.

DESCRIPTION OF THE PREFERRED EMBODIMENT

An embodiment of the invention will now be described in detail with reference to the accompanying drawings. The outlines of such embodiment will first be described with reference to FIGS. 1 through 3 for a better understanding, rather than going into detail at the outset.

Figure 1:
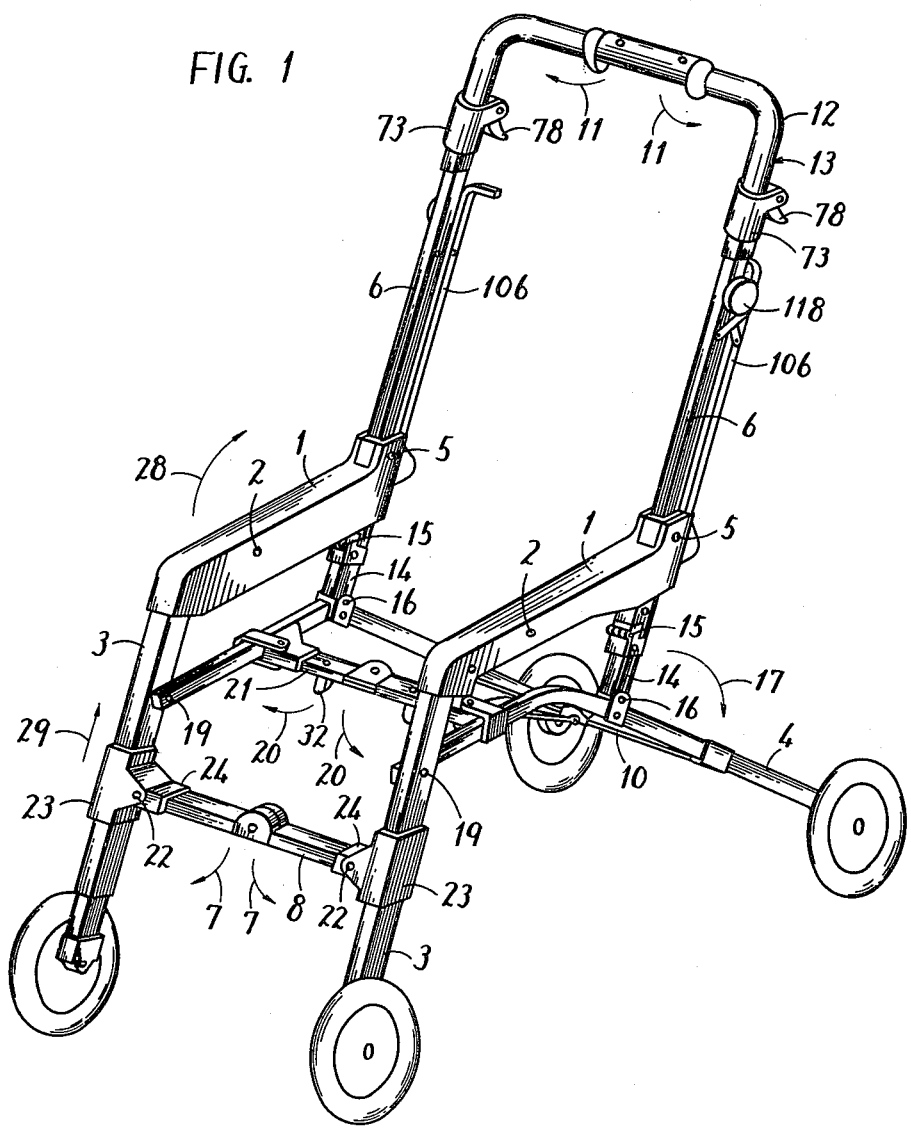
FIG. 1 is a perspective view of a baby carriage in the opened state according to an embodiment of the present invention.
Figure 2:
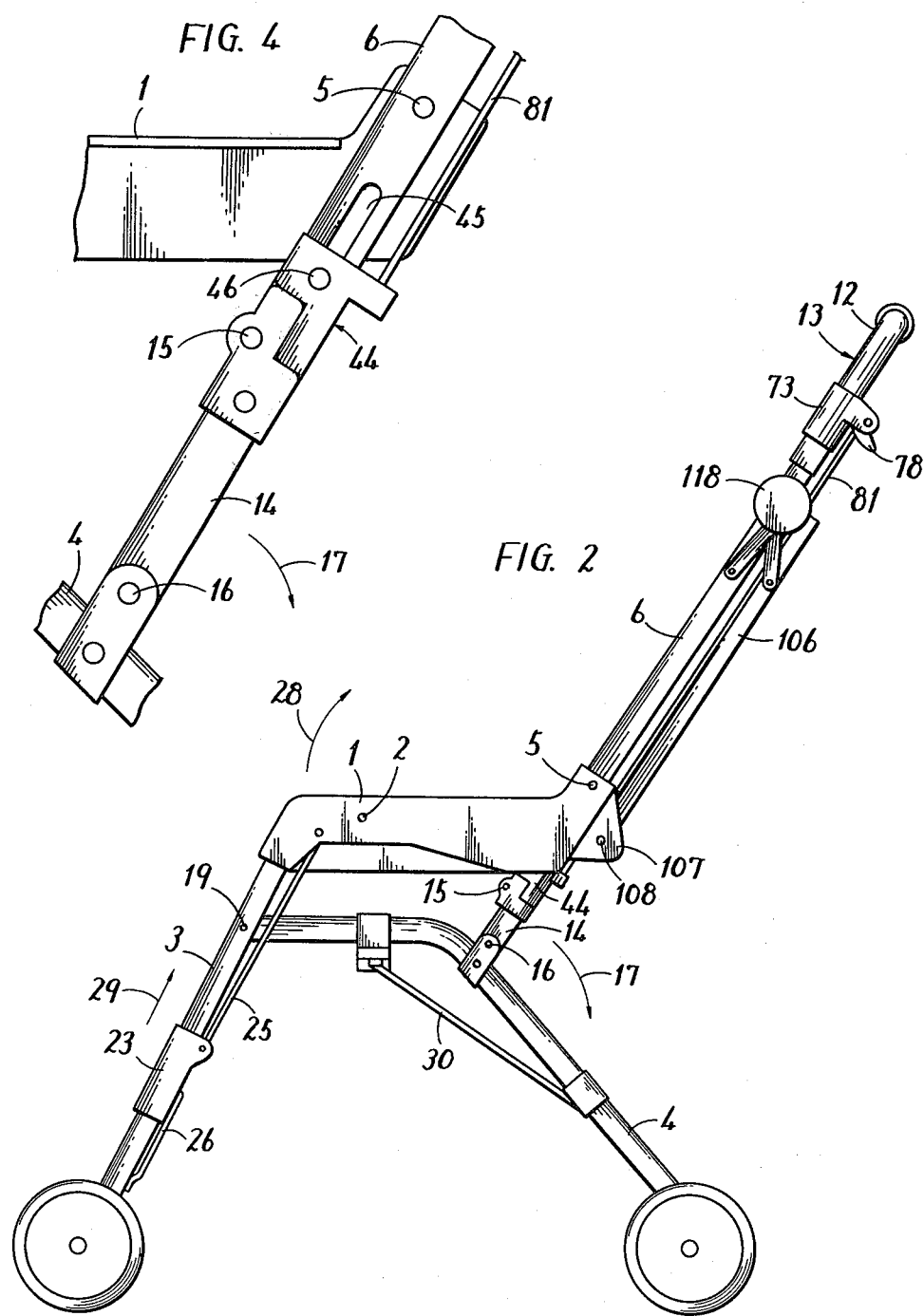
FIG. 2 is a right-hand side view of the baby carriage of FIG. 1.
Figure 3:
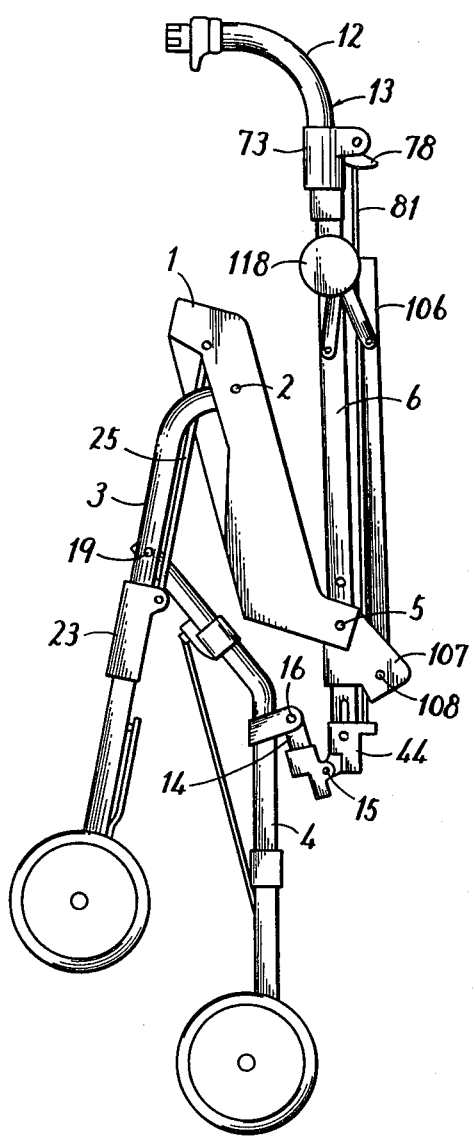
FIG. 3 is a right-hand side view of the baby carriage of FIG. 1 but in the closed state.

FIG. 1 is a perspective view of a baby carriage in its opened state embodying the present invention; FIG. 2 is a right-hand side view of the same; and FIG. 3 is a right-hand side view of said baby carriage in its closed state. Basically, the baby carriage shown therein comprises a pair of support leg pusher rod connecting rods 1, a pair of front legs 3 pivotally supported on support leg pivot pins 2 in the relatively forward or approximately intermediate regions of said support leg pusher rod connecting rods, a pair of rear legs 4 pivotally supported on rear leg pivot pins 19 in the intermediate regions of said front legs 3 and extending rearwardly downward therefrom, a pair of pusher rod bodies 6 pivotally supported on pusher rod pivot pins 5 at points spaced a predetermined distance from the lower end of each pusher rod body and in the rear end portions of said support leg pusher rod connecting rods 1, a front leg connecting rod 8 connecting said front legs 3 and foldable only downwardly (in the direction of arrows 7), first and second rear leg connecting rods 10 and 21 which connect the rear legs 4 and which are foldable, and a pusher rod connecting member 12 which connects the pusher rod bodies 6 and which is foldable only forwardly (in the direction of arrows 11). The pusher rod bodies 1 and pusher rod connecting member 12 constitute a pusher rod 13.

In such basic construction, the lower ends of the pusher rod bodies 6 and the rear legs 4 are foldably connected together by pusher rod support angle bars 14 through pivot pins 15 and 16, so that depending upon whether the pusher rod support angle bars 14 are turned around the axis of the pivot pin 16 upwardly (as shown in FIGS. 1 and 2) or downwardly in the direction of arrow 17 (as shown in FIG. 3), the lower ends of the pusher rod bodies 6 are brought to a relatively high level or a relatively low level with respect to the rear legs 4. When the lower ends of the pusher rod bodies 6 are brought to a relatively high level with respect to the rear legs 4, the opened state of the baby carriage is established. The shape and construction of the related members are so selected that when the lower ends of the pusher rod bodies 6 are brought to a relatively low level with respect to the rear legs 4, the support leg pusher rod connecting rods 1, pusher rod bodies 6 and rear legs 4 are substantially parallel to each other, thereby establishing the folded state of the baby carriage.

The basic construction of the foldable baby carriage has thus been completed.

The various parts will now be described in detail.

Figure 5:
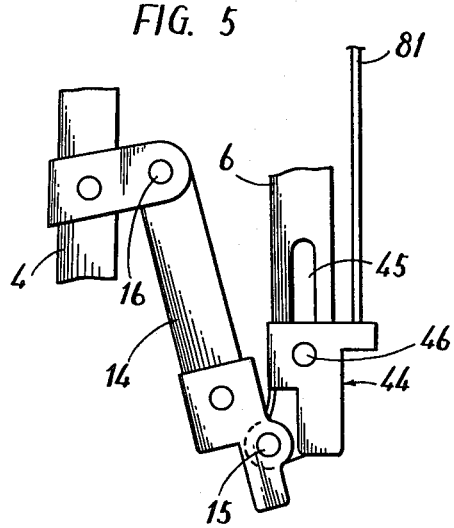
FIG. 5 is an enlarged side view showing a state corresponding to FIG. 3, illustrating the movement of the pusher rod support angle bar 14.

FIGS. 4 and 5 are enlarged side views for explanation of the movement of the pusher rod support angle bars 14, but the movement of the pusher rod support angle bars 14 is related to a description of the portion shown in FIGS. 12 through 15 to be later given and will be later described in connection with FIGS. 12 through 15.

Figure 7:
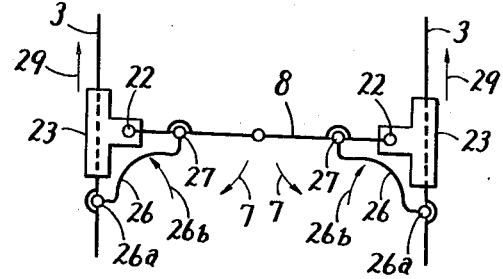
FIG. 7 is a diagrammatic view illustrating the movement of the portion shown in FIG. 6, the view corresponding to the opened state of the baby carriage.
Figure 8:
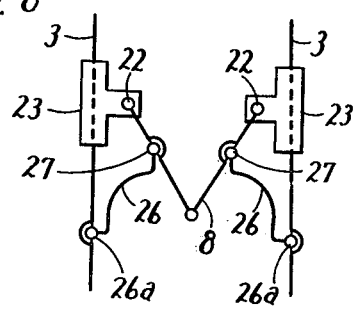
FIG. 8 is a diagrammatic view illustrating the movement of the portion shown in FIG. 6, the view corresponding to the closed state of the baby carriage.
Figure 6:
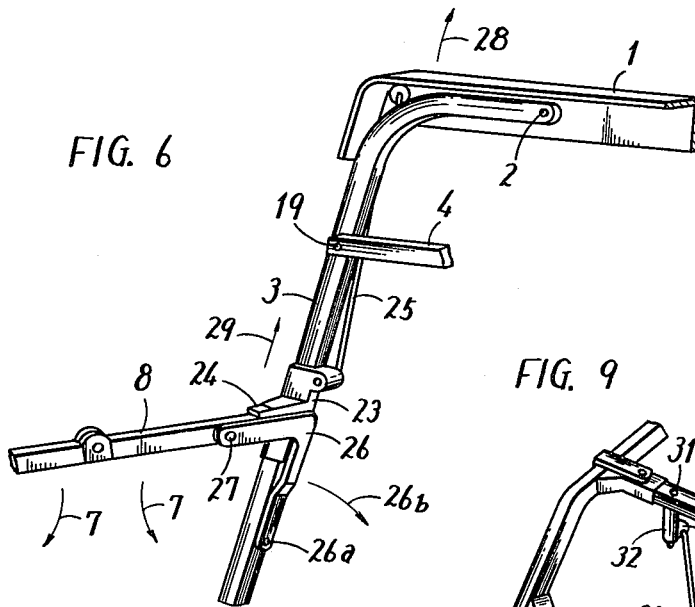
FIG. 6 is a perspective view, as seen from the rear, of the operatively connected portions of a support leg pusher rod connecting rod, a front leg 3 and a front leg connecting rod 8.

FIG. 6 is a perspective view, as seen from the rear, of the operatively connected portions of the support leg pusher rod connecting rod 1, front leg 3 and front leg connecting rod 8. FIGS. 7 and 8 are diagrammatic views for explanation of the movements of the components shown in FIG. 6. Referring to FIGS. 6 through 8, as well as FIGS. 1 through 3, the front leg connecting rod 8 is pivotally connected at its ends to connecting rod turning members 23 by pivot pins 22. Each connecting rod turning member 23 is provided with a socket portion 24 of inverted U shaped cross-section placed on top of the front leg connecting rod 8 to cover said end portion. The connecting rod turning member 23 is axially slidably fitted on the associated front leg 3 in the middle region thereof. A bar link 25 is connected between the connecting rod turning member 23 and the front end of the support leg connecting rod 1. An L shaped arm 26 extends from the front leg 3 and is pivotally connected thereto by a pivot pin 26a. The front leg connecting rod 8 is pivotally supported on pivot pins 27 each carried at the front end of the associated arm 26 and positioned at a predetermined distance from the associated end of the front leg connecting rod 8.

Referring to FIG. 6 and other figures, if the support leg pusher rod connecting rod 1 is turned around the axis of the pivot pin 2 in the direction of arrow 28, the connecting rod turning member 23 is slid on the front leg 3 in the direction of arrow 29. In response thereto, the arm 26 is turned in the direction of arrow 26b, while the front leg connecting rod 8 is turned around the axes of the pivot pins 27 in the direction of arrows 7 and is thereby downwardly folded (FIG. 8).

The reverse movement of the front leg connecting rod 8 of FIG. 8 from its folded position is effected by the turning of the support leg pusher rod connecting rod 1 in the opposite direction to cause the bar link 25 to depress the connecting rod turning member 23. Thus, the force exerted by this movement acts to turn the front leg connecting rod 8 from the FIG. 8 state to straighten the same while turning the arm 26 downwardly, thereby establishing the FIG. 7 state.

When the front leg connecting rod 8 is in the straightened state as shown in FIG. 5 and other figures, that is, when the baby carriage is in the opened state, the application of a downward force on the front leg pusher rod connecting rod 1 (which force is produced, for example, by the weight of a baby placed on a hammock attached to the front leg pusher rod connecting rods 1) causes the bar link 25 to force the connecting rod turning member 23 downwardly (in the direction opposite to the direction of arrow 29), resulting in downwardly forcing the end portion of the front leg connecting rod 8 received in the socket portion 24 of the connecting rod turning member 23, thus forcing the front leg connecting rod 8 to fold upwardly, which means inhibiting the front leg connecting rod 8 from turning in the direction of arrow 7. That is, the greater the amount of load applied, the more firmly the baby carriage is maintained in the opened state.

Figure 9:
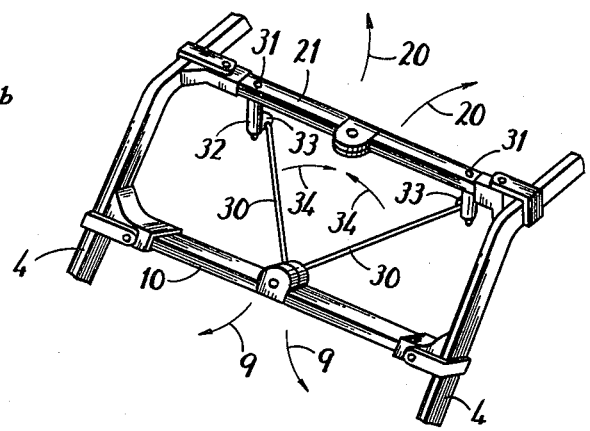
FIG. 9 is a perspective view, as seen from the rear, of the operatively connected portions of rear leg connecting rods 10, 21 and rear legs 4.

FIG. 9 is a perspective view of the operatively connected portions of the rear leg connecting rods 10 and 21 and the rear legs 4, as seen from the rear. Referring to FIG. 9 together with FIGS. 1 through 3, the first and second rear leg connecting rods 10 and 21 are parallel to each other. They are foldable in the directions of arrows 9 and 20, respectively, to provide for the folding movement of the baby carriage to be later described. It is so arranged that the folding movements of the two rods are interlocked with each other by a pair of tie rods 30. The tie rods 30 are connected between the foldable portion of the first rear leg connecting rod 10 and the second rear leg connecting rod 21 at positions spaced a predetermined distance from and on opposite sides of the foldable portion of the second rear leg connecting rod. The second rear leg connecting rod 21 is provided with lugs 33 projecting laterally from sleeves 32 turnable around the axes of shafts 31 for receiving the tie rods 30. That is, the lugs 33 have one of the respective ends of the tie rods 30 attached thereto.

In response to the folding movement of the baby carriage, the rear legs 4 move toward each other. At the start of the folding movement, preferably, the foldable portion of the first rear leg connecting rod 10 is stepped on by one foot so as to fold the first rear leg connecting rod 10 in the direction of arrows 9 (downwardly). As a result of the folding of the first rear leg connecting rod 10 in the direction of arrows 9 and the movement of the rear legs 4 toward each other, the pair of tie rods 30 are turned in the direction of arrows 34. In response to the turning of the tie rods 30, the end-to-end distance defined by the tie rods 30 is increased, whereby the second rear leg connecting rod 21 is moved away from the first leg connecting rod 10, that is, folded in the direction of arrows 20. In addition, the reverse operation is likewise carried out in the interlocking relation which is established by the tie rods 30.

Figure 10:
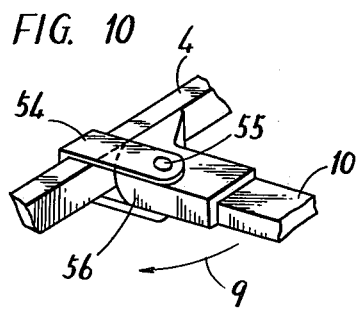
FIG. 10 is a perspective view of a pivotal support portion where a rear leg connecting rod 10 is pivotally connected to a rear leg 4.
Figure 11:
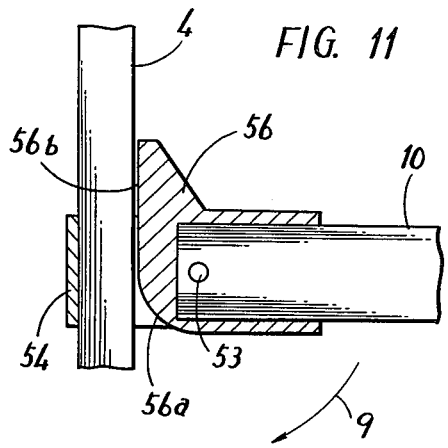
FIG. 11 is a plan view, partly in section, of the portion shown in FIG. 10.

FIG. 10 is a perspective view of a pivot portion for the rear leg connecting rod 10 relative to the rear leg 44, and FIG. 11 is a plan view, partly in section, of said pivot portion. The first rear leg connecting rod 10 is pivotally connected by a pivot pin 55 to a U shaped connector 54 fixed to the rear leg 4. The end of the rear leg connecting rod 10 is formed with a rotation stop 56, which is formed with a surface 56b extending from a curved surface 56a in a direction at right angles with the direction of the length of the rear leg connecting rod 10, said surface 56b abutting against the rear leg 4 so that the rear leg connecting rod 10 can be turned only in the direction of arrows 9.

In addition, the above arrangement applied to the first rear leg connecting rod 10 is also applied to the second rear leg connecting rod 21.

Figure 12:
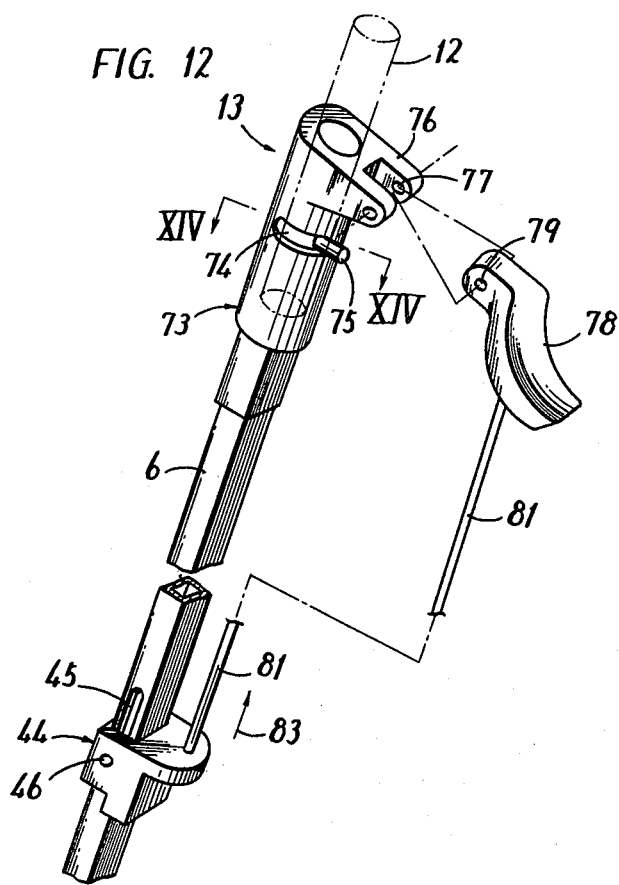
FIG. 12 is a perspective view, partly exploded illustrating a peripheral arrangement around an operating lever 78 included in operating means installed in connection with a pusher rod 13.
Figure 15:
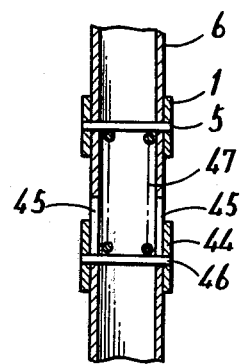
FIG. 15 is a longitudinal section illustrating a peripheral arrangement around a sleeve 44 of FIG. 12.
Figure 13:
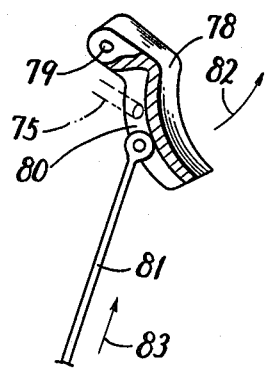
FIG. 13 is a perspective view, partly broken, of the operating lever 78 of FIG. 12.
Figure 14:
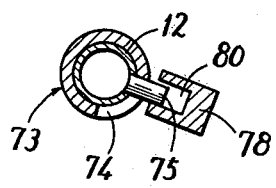
FIG. 14 is a sectional view taken along the line XIV—XIV of FIG. 12.

FIGS. 12 through 15 are views for explanation of one example of operating means associated with the pusher rod 13. FIG. 12 is a partly exploded perspective view of an arrangement around an operating lever; FIG. 13 is a fragmentary perspective view of the operating lever; FIG. 14 is a sectional view taken along the line XIV—XIV of FIG. 12; and FIG. 15 is a longitudinal section of an arrangement around a sleeve. The upper end of each pusher rod body 6 is formed with a guide socket 73. The latter receives an end of the pusher rod connecting member 12. The pusher rod connecting member 12 is formed of a round pipe or bar and is turnable within the guide socket 73 around the axis of the latter. The lateral surface of the guide socket 73 is formed with an elongated guide opening 74 extending through about 90 degrees for receiving a guide pin 75 which is fixed to the pusher rod connecting member 12. The guide socket 73 is formed with a bracket 76 having throughgoing holes 77 formed therein. An operating lever 78 has a throughgoing hole 79. With the throughgoing holes 79 and 77 aligned with each other, a shaft (not shown) is inserted into said holes, so that the operating lever 78 is turnably supported in the guide socket 73. The operating lever 78 has a recess 80 therein on its downwardly directed surface. The portion where said recess 80 is formed has the upper end of a rod 81 attached thereto, the lower end of said rod 81 being attached to a sleeve 44.

The arrangement around the sleeve 44 is also shown in FIGS. 4 and 5. Referring also to FIGS. 4 and 5, the sleeve 44 is slidably fitted on the lower portion of the pusher rod body 6. Adjacent the sleeve 44, the pusher rod body 6 is formed with an elongated opening 45 and a pin 46, which extends through said elongated opening 45, is fixed to the sleeve 44. The cooperative action of the elongated openings 45 and 46 defines the range of slide movement of the sleeve 44. As shown in FIG. 15, a spring 47 is installed inside the tubular pusher rod body 6 and between the pins 5 and 46 downwardly elastically urges the sleeve 44 at all times. As a result, the lower end surface of the sleeve 44 is urged into engagement with the end of the pusher rod support angle bar 14 to keep the pusher rod body 6 and pusher rod support angle bar 14 straightened, thereby securing the opened state of the baby carriage (FIGS. 4, 1 and 2).

The operating lever 78 has the dual function of releasing the sleeve 44 from the pusher rod support angle bar 14 and keeping the pusher rod connecting member 12 from turning relative to the pusher rod body 6. Thus, if the operating lever 78 is turned downwardly, the guide pin 75 is received in the recess 80 (FIGS. 13 and 14), thereby inhibiting the pusher rod connecting member 12 from turning relative to the guide socket 73. If the operating lever 78 is turned in the direction of arrow 82, the rod 81 is displaced in the direction of arrow 83, releasing the sleeve 44 from the pusher rod support angle bar 14, while the guide pin 75 comes out of the recess 80, enabling the pusher rod connecting member 12 to turn. Thereupon, the operating lever 78 is upwardly turned beyond the dead point and becomes stabilized.

The turning of the operating lever 78 in the direction of arrow 82 triggers a folding operation on the baby carriage to be later described. In response thereto, the lower end surface of the sleeve 44 is released from the upper end of the pusher rod support angle bar 14, enabling the pusher rod body 6 and pusher rod support angle bar 14 to be folded. Therefore, as best shown in FIG. 5, the pusher rod body 6 and pusher rod support angle bar 14 are folded at the pivot pin 15 so that they are substantially parallel with each other. In addition, in FIG. 5, with the operating lever 78 turned downwardly, the sleeve 44 is shown in the downwardly displaced position under the action of the spring 47. Therefore, when it is desired to bring the baby carriage from the folded state to the opened state, the operating lever 78 is turned again in the direction of arrow 82 to move the sleeve 44 upwardly until its lower end assumes a position which allows turning to the angle bar 14, whereupon the opening operation is carried out. When the pusher rod body 6 and pusher rod support angle bar 14 are in line with each other, the operating lever 78 is turned downwardly, forcing the other end surface of the sleeve 44 into engagement with the upper end of the pusher rod support angle bar 14, thereby stabilizing the opened state of the baby carriage.

Referring again to FIGS. 1 and 2, a hammock attached to the baby carriage will now be described. The hammock itself is omitted from illustration, but it is of the chair type comprising a back rest and a seat. The back rest is retained by back rest retaining rods 106, while the seat is formed in a plane defined by the front horizontal portions of the rear legs 4 and the second rear leg connecting rod 21. The back rest is constructed so that it can be reclined, the reclined state being established by the turning of the back rest retaining rods 106 pivotally supported by the connectors 107 at pivot pins 108. The back rest retaining rods 106 are turned and fixed at a desired position by means of operating members 108.

The construction of the baby carriage has so far been described in detail. The folding operation or movement of the baby carriage will now be described.

Referring to FIGS. 1, 2 and 4, in the opened state, the pusher rod support angle bars 14 have been turned upwardly relative to the rear legs 4, with the result that the lower ends of the pusher rod bodies 6 have been brought to a relatively high position with respect to the rear legs 4. In this case, the pusher rod bodies 6 and pusher rod support angle bar 14 are maintained in a straight line. Further, the front legs 3 are in contact with the back surfaces of the support leg pusher rod connecting rods 1 so that they are inhibited from turning clockwise as seen in FIG. 2 around the axes of the pivot pins 2. As a result, the opened state has been established.

The folding operation on the baby carriage proceeding from the state shown in FIGS. 1, 2 and 4 to the state shown in FIGS. 3 and 5 will now be described. First, the operating lever 78 is turned in the direction of arrow 82 (FIG. 10) until it is brought to an upwardly inverted state. In this state, since the operating lever has passed the dead point, it is maintained in its position even if urged by the spring 47. At this time, the guide pin 75 has come out of the recess 80 to render the pusher rod connecting member 12 turnable. Further, the pressure engagement between the sleeve 44 and the pusher rod support angle bar 14 has been canceled. The operation described so far can be performed by successively manipulating the two operating levers 78 by one hand. Next, one side of the middle foldable portion of the pusher rod connecting rod 12 is gripped by one hand and the pusher rod 13 is tilted slightly forward while applying a twisting force thereto in the direction of arrows 11, so as to cause the pusher rod support angle bars 14 to turn a little in the direction of arrow 17. Thereafter, the pusher rod 13 is downwardly thrusted by the hand which has grasped the pusher rod connecting member 12. When this thrusting operation is performed, at least the rear wheels are engaged with the ground. In response thereto, the pusher rod support angle bars 14 are further turned in the direction of arrow 17 and at last they are downwardly directed. In response thereto, the support leg pusher rod connecting rods 1 are turned around the axes of the pivot pins 2 in the direction of arrow 28, causing the bar links 25 to slide the connecting rod turning members 23 in the direction of arrow 29. As a result, the front leg connecting rod 8 is folded in the direction of arrows 7. Because of the folding of the front leg connecting rod 8 and the folding of the pusher rod connecting members 12 in the direction of arrow 12, the widthwise dimension of the baby carriage is reduced. Concurrently therewith, therefore, the first rear leg connecting rod 10 is folded in the direction of arrows, causing the tie rods 30 to fold the second leg connecting rod 21 in the direction of arrows 20. Further, in response to the turning of the support leg pusher rod connecting rods 1 in the direction of arrow 28, the front legs 3 are drawn toward the rear legs 4. These folding movements proceed substantially simultaneously, until the pusher rod support angle bars 14 are arranged substantially side by side with the lower halves of the rear legs 4. Further, the front and rear legs 3 and 4 are gathered together substantially in parallel relation, while the support leg pusher rod connecting rods 1 and rear legs 4 are also brought to a position where they are substantially parallel with each other. Further, the front leg connecting rod 8, rear leg connecting rods 10 and 21 and pusher rod connecting member 12 are sufficiently folded to cause the support leg pusher rod connecting rods 1, front legs 3, rear legs 4, pusher rod bodies 6, pusher rod connecting member 12, and back rest retaining rods 106 to move toward each other, thereby establishing the folded state in which the widthwise dimension also has been reduced.

When it is desired to change the folded state shown in FIGS. 3 and 5 to the opened state shown in FIGS. 1, 2 and 4, this can be attained basically by reversing the procedure described above, whereby the reversed operation takes place. In brief, the operator twists the pusher rod connecting member 12 to unfold the same and draws it backward while sowewhat lifting it so as to turn the pusher rod support angle bars 14 counterclockwise as seen in FIGS. 3 and 5 through the pusher rod bodies 6. In response thereto, the pusher rod support angle bars 14 are turned toward the upper regions of the rear legs 4, while the support leg pusher rod connecting rods 1 are also turned counterclockwise, causing the bar links 25 and the connecting rod turning members 23 to straighten the front leg connecting rod 8 and turning the front legs 3 to move away from the rear legs 4 until they abut against the back surfaces of the support leg pusher rod connecting rods 1, whereby the end of said turning of the front legs is defined. Because of the increase in widthwise dimension which has been already produced, the first and second rear leg connecting rods 10 and 21 are straightened in interlocked relation by the action of the tie rods 30. When the state shown in FIGS. 1, 2 and 4 is finally established, the operating levers 78 are turned downwardly, whereupon the recesses 80 in the operating lever 78 receive the guide pins 75 to inhibit folding of the pusher rod connecting member 12 while the sleeves 44 are forced into engagement with the pusher rod support angle bars 14 to inhibit folding of the pusher rod support angle bars 14 and pusher rod 13, thereby establishing the firm opened state of the baby carriage.

FIG. 16 shows another embodiment of the present invention, being a right-hand side view of a baby carriage in its opened state. FIG. 16 corresponds to FIG. 2 and like reference numerals are given to corresponding parts and only the arrangement which differs from that in the preceding embodiment will be described.

In the embodiment shown in FIG. 16, the shape and manner of attachment of the pusher rod support angle bars 14 have been changed. More particularly, although the pusher rod support angle bars 14 are pivotally connected to the pusher rod bodies 6 by pivot pins 15 and to the rear legs 4 by pivot pins 16, their shape is such that they extend along portions of the rear legs when in the opened state. Further, the pivot pins 16 are positioned at a lower level relative to the rear legs 4 than in the preceding embodiment.

According to this embodiment, since the pivot pins 15 are brought to a lower level, the pusher rod 13 can be positioned at a lower level when the baby carriage is in the folded state, so that the vertical dimension of the baby carriage in the folded state can be further reduced.

Figure 17:
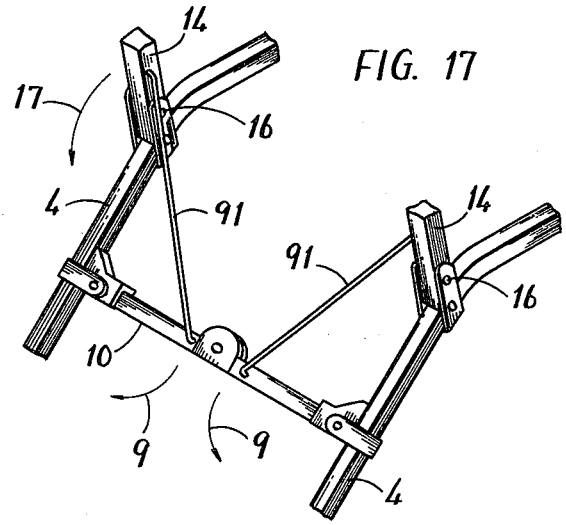
FIG. 17 is a perspective view of a further embodiment of the invention, illustrating the operatively connected portions, as seen from the rear, of a rear leg connecting rod 10 and pusher rod support angle bars 14.

FIG. 17 shows a further embodiment of the invention, being a perspective view, as seen from the rear, of the operatively connected portions of the rear leg connecting rod 10 and pusher rod support angle bars 14.

In the embodiments described above, two rear leg connecting rods 10 and 21, as shown in FIG. 9, have been provided which are arranged so that they can be folded and straightened in interlocked relation by the action of the tie rods 30 in connection with the movement of the rear legs 4 toward and away from each other. On the other hand, the embodiment to be described with reference to FIG. 17 is so designed that one of the rear leg connecting rods, for example, the first rear leg connecting rod 10, is connected to the pusher rod support angle bars 14 by rods 91. The rods 91 are pivotally connected, each at one end thereof, to the substantially intermediate regions of the pusher rod support angle bars 14 and, at the other ends thereof, to the rear leg connecting rod 10 at positions spaced a predetermined distance from and on opposite sides of the intermediate portion thereof.

In the arrangement described above, when the pusher rod support angle bars 14 are turned around the axes of the pivot pins 16 in the direction of arrow 17 (FIGS. 17 and 2), the rods 91 depress the rear leg connecting rod 10 to positively fold the latter in the direction of arrows 9.

In addition, the arrangement shown in FIG. 17 may be combined with the arrangement shown in FIG. 9. Further, rods corresponding to the rods 91 may be connected to the second rear leg connecting rod 21 (FIG. 9) so as to positively operatively associate the turning of the support angle bars 14 with the folding of the second rear leg connecting rod 21.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A baby carriage comprising;
   a pair of support leg pusher rod connecting rods (1) disposed to extend longitudinally,
   a pair of front legs (3) each pivotally connected (2) to the relatively forward portion of the associated support leg pusher rod connecting rod (1),
   a pair of rear legs (4) each pivotally connected (19) to the intermediate portion of the associated front leg (3) and rearwardly downwardly extending therefrom,
   a pair of pusher rod support angle bars (14) each pivotally connected at one end thereof (as at 16) to the intermediate portion of the associated rear leg (3) and adapted to be vertically turnable,
   a pair of pusher rod bodies (6) each pivotally connected at the lower end thereof (15) to the other end of the associated pusher rod support angle bar (14) and pivotally connected to the rear end of the associated support leg pusher rod connecting rod (1) at a pivot point (5) spaced a predetermined distance from the lower end of said pusher rod body,
   a pair of connecting rod turning members (23) each axially slidably fitted on the middle portion of the associated front leg (3),
   a pair of arms (26) each extending from said front legs (3),
   a front leg connecting rod (8) downwardly foldable at the middle thereof, pivotally connected at the opposite ends thereof (22) to said connecting rod turning members (23) and pivotally connected at positions spaced a predetermined distance from each end thereof to said arms (26),
   bar links (25) connected between said connecting rod turning members (23) and the front ends of said support leg pusher rod connecting rods (1), and
   a pusher rod connecting member (12) foldable at the middle thereof and pivotally supported at the opposite ends thereof by said pusher rod bodies (6),
   the arrangement being such that when said pusher rod support angle bars (14) are upwardly turned each around a pivot point (16) on one end thereof, the opened state of the baby carriage is established and that when said pusher rod connecting member (12) is folded and said pusher rod support angle bars (14) are turned in the opposite direction around said pivot points (16), said front legs (3), rear legs (4), support leg pusher rod connecting rods (1) and pusher rod bodies (6) are respectively turned toward each other while in response to the turning of said support leg connecting rods (1) said bar links (25) cause said connecting rod turning members (23) to slide upward while folding said front leg connecting rod (8), thereby establishing the folded state of the baby carriage in which the longitudinal, transverse and vertical dimensions thereof have been reduced.

2. A baby carriage as set forth in claim 1, which further comprises a first rear leg connecting rod (10) downwardly foldable at the middle thereof and pivotally connected to the lower portions of said pair of rear legs (4).

3. A baby carriage as set forth in claim 2, which further comprises a second rear leg connecting rod (21)

forwardly foldable at the middle thereof and pivotally connected at the opposite ends thereof to the front portions of said pair of rear legs (4).

4. A baby carriage as set forth in claim 3, which further comprises a pair of tie rods (30) disposed in V form between the foldable portion of said first rear leg connecting rod (10) and pivot points (31) spaced a predetermined distance from and on opposite sides of the foldable portion of said second rear leg connecting rod (21).

5. A baby carriage as set forth in claim 2, which further comprises rods (91) connected between said first rear leg connecting rod (10) and said pusher rod support angle bars (14) and serving to operatively associate the folding movement of the first rear leg connecting rod (10) with the turning movement of the pusher rod support angle bars (14).

6. A baby carriage as set forth in claim 1, which further comprises sleeves (44) each axially slidably fitted on the lower end of the associated pusher rod body (6), and means for forcing said sleeves (44) into engagement with the other ends of said pusher rod support angle bars (14), thereby fixing the angle between said pusher rod support angle bar (14) and said pusher rod body (6).

7. A baby carriage as set forth in claim 6, which further comprises operating means (78, 81) for releasing said sleeves (44) from the other ends of said pusher rod support angle bars (14).

8. A baby carriage as set forth in claim 1, wherein said pusher rod connecting member (12) is foldable at the middle thereof and pivotally connected at the opposite ends thereof to said pair of pusher rod bodies (6), said pusher rod connecting member having portions at which it is attached to said pusher rod bodies (6), the axes of said portions being aligned with the axes of said pusher rod bodies.

9. A baby carriage as set forth in claim 8, which further comprises means (75, 80) for inhibiting turning of said pusher rod connecting member (12) relative to said pusher rod bodies (6) at said axially aligned portions.

* * * * *